United States Patent [19]
Brockman et al.

[11] 3,779,400
[45] Dec. 18, 1973

[54] MICROMANIPULATOR SYSTEM

[75] Inventors: William H. Brockman; Mary H. Greer, both of Ames, Iowa

[73] Assignee: Iowa State University Research Foundations, Inc., Ames, Iowa

[22] Filed: Feb. 14, 1972

[21] Appl. No.: 225,877

[52] U.S. Cl. ............ 214/1 BB, 214/1 CM, 318/687
[51] Int. Cl. .............................................. B25j 3/04
[58] Field of Search ...................... 214/1 CM, 1 BB; 318/687

[56] References Cited
UNITED STATES PATENTS
3,449,754   6/1969   Stutz .............................. 318/687 X
FOREIGN PATENTS OR APPLICATIONS
1,925,152   5/1969   Germany ......................... 214/1 CM Primary Examiner—Gerald M. Forlenza
Assistant Examiner—George F. Abraham
Attorney—James J. Hill

[57] ABSTRACT

A system for manipulating tools or samples over very small distances uses orthogonally-oriented linear electromechanical transducers connected to a tool by means of a bendable linkage to control the position of the tool. A control stick is connected to three linear potentiometers, and when it is moved by an operator in a desired direction, the potentiometers are positioned to generate signals to control their associated electromechanical transducers such that the tool or the sample moves in the desired direction, also.

2 Claims, 5 Drawing Figures

PATENTED DEC 18 1973 3,779,400

MICROMANIPULATOR SYSTEM

BACKGROUND AND SUMMARY

The present invention relates to a system for controlling the position of a tool or sample over very small distances, on the order of a few thousandths of an inch. Such systems are commonly referred to as micromanipulators, and they are used, for example, in conducting research on living neural tissue at the cellular level.

One commercially available micromanipulator which will perform the required functions is a de Fonbrune type pneumatic micromanipulator, No. 508090, manufactured by Aloe Scientific of St. Louis, Missouri. This system includes a manipulator which is controlled by an operator and a receiver which positions a tool or instrument. In this context, the word "tool" is to be taken to have a very broad meaning to include any workpiece, instrument, transfer agent, injectors, electrode, etc. which may be desired to be positioned very accurately.

The manipulator of this commercially available system consists of three pneumatic pumps set at right angles on a universal joint. The two horizontal pumps produce motion in the horizontal plane, and the vertical pump (which actually is in the control lever) produces motion in a vertical direction. The horizontal pumps are actuated by moving the control lever in the desired horizontal direction. The pumps may be operated simultaneously so as to simulate any desired angular movement of the instrument or tool. The vertical pump is actuated by rotating a knob at the end of the control lever, thereby screwing it up or down. An adjustable sleeve is mounted along the axis of the control lever to adjust the ratios of horizontal movement. As this sleeve is raised or lowered, the amplitude of the pistons in the horizontal pumps is correspondingly adjusted. The range of the tool in the vertical plane is controlled directly by the screw knob at the top of the control lever.

The receiver of the de Fondrune type system is a pneumatic mechanism consisting of a heavy adjustable base plate and three capsules fitted with sensitive metallic membranes interconnected by a transmission rod. The capsules are mounted on the adjustable plate at right angles to correspond to the positions of the pneumatic pumps. Each capsule is connected by means of a metal tube to an aperture with a tip projecting from the base plate. Each capsule is fitted with a metallic membrane that expands or contracts in response to the minute changes in air pressure as transmitted from the pneumatic pumps. A connecting rod joining the pneumatically actuated membranes is connected to the tool holder to correlate the displacement of all three membranes.

The primary disadvantage of the pneumatic micromanipulator described above is its high cost. Certain types of research may for example, call for the positioning of a number of independent electrodes within a tissue sample, and if a separate pneumatic manipulator had to be purchased for each such electrode, the cost would be prohibitive for most researchers. Although the primary motivation for conception of the present invention, then, was to produce a micromanipulator system of substantially reduced cost, nevertheless, certain additional advantages are inherent in the system of the present invention, as will be explained in more detail presently.

The present invention uses three linear electromechanical transducers with their axes of linear motion mounted in orthogonal directions. A bendable linkage connects a dowel pin or rod on which the instrument is mounted to the movable elements of the transducers. The transducers may be conventional audio speakers of the type used to reproduce sound in radios and the like.

A control lever is actuated by an operator, and it is connected to three linear potentiometers by a bendable linkage similar to the one which connects the transducers to the tool. The potentiometers are arranged in orthogonal directions for generating electrical signals representative of an intended direction of movement of the instrument or tool. The signals are fed to the electromechanical transducers to control the position of the tool in correspondence with the position of the hand lever, but on a much reduced scale. The movement ratio is the ratio of movement between the hand lever and the resulting movement of the instrument.

In one embodiment, the transducer for vertical motion is arranged to move the sample rather than the tool or instrument, while the other two transducers move the tool in a horizontal plane. This avoids the need to re-focus an observer's microscope by holding the working end of the tool in a fixed plane of focus under vertical microscopic view.

By thus using electromechanical transducers to control the positioning of the tool, and potentiometers to control the strength of the signal fed to each transducer, the cost of a micromanipulator system is greatly reduced while maintaining a position accuracy of approximately 5 microns.

The tool may be attached to the end of a wooden dowel rod, the other end of which is connected to the movable portion of one electromechanical transducer by means of a bendable plastic tube. The other two connecting links may be similar rods connected at one end to its associated transducer by means of a plastic sleeve and at the other end to an intermediate portion of the elongated tool-holding rod by means of a similar plastic tube. Similar radio speakers with the peripheral portion of the diaphragm cut out to reduce resistance to motion have been found effective as electromechanical transducers.

Because the position of the tool can be observed visually by means of a stereoscopic microscope, the major difficulty is controlling the position of the tool in a three-dimensional space with a high potential resolution, (i.e., following the motion of the hand lever), as distinguished from a calibrated position control such as a micrometer drive. The present system permits positional control with high resolution with no critical dimensions or tolerances in construction of the system and wherein all of the major components of the system are readily available commercially at low cost.

The present invention eliminates mechanical connections between the hand lever and the tool positioner, and it permits the use of electrical cables of any desired length between the hand lever and the tool positioner without the mechanical problems which accompany the use of long tubes in a pneumatic system. The electrical connection has further advantages over other mechanical systems in eliminating any mechanical interconnection between the hand lever and the tool positioner. The electromechanical transducers are easily replaced at low cost, and the electronic circuitry may be constructed of conventional, reliable circuit elements, also available at low cost.

In addition, the movement of the control lever can be made to coincide with the apparent movement of the tool or instrument, even in cases where the image of the probe is reversed (as in a microscopic view), by proper positioning of the transducers and/or their associated potentiometers at the hand lever. Alternatively, reversal of apparent movement can be accomplished by reversing the electrical connection to the transducers.

Vertical positioning of the tool is accomplished by a type of control which is similar to the control of the horizontal axes of motion—that is, by translating the hand lever. This type of control has been found to be more normal for conventional usage, as distinguished from the above-described pneumatic device which uses a rotating knob control for vertical movement and "joy-stick" control for the other axes.

If movement is desired in less than three dimensions, a corresponding fewer number of electromechanical transducers may be used. Further, the vertical positioning mechanism may be separated from the other two axes and arranged to control the movement of the specimen or experimental preparation, as distinguished from the control of the tool. This, as already mentioned, is useful in maintaining the tip of the tool or probe in a fixed plane of focus under vertical microscopic view.

The amount of movement of the tool vertically and in one horizontal direction can be varied by adjusting the length of the supporting rod to achieve any desired mechanical advantage. Thus, the mechanical movement ratio between the hand lever and the tool may be adjusted over a relatively wide range. This type of ratio adjustment may be also effected through changing the gain of the electronic control circuitry, and the electronic ratio adjustment (that is, ratio of the movement of the hand lever to the movement of the tool) may or may not be used in combination with ratio adjustment by changing the length of the tool support rod.

The electronic control circuitry employs conventional voltage controlled DC power supplies which may be used in a laboratory for other purposes when the micromanipulator is not being used. Further, because control is brought about through electronic circuitry, it is possible to automate the positioning of the tool or probe by means of programmed electronic signals, thus greatly enhancing the versatility of the system without increasing the cost of the basic system exclusive of the programmed controller. With the present invention the movement of the tool may be accomplished in any desired linear direction, whether or not it is aligned with an axis of one of the electromechanical transducers through control of the hand lever which may simultaneously vary the activating voltage to all of the linear potentiometers to which it is coupled. The position of the control lever defines the relative movement of the tool in each axis, and thus its direction of motion.

Other features and advantages of the present invention will be apparent to persons skilled in the art from the following detailed description of preferred embodiments accompanied by the attached drawing wherein identical reference numerals will refer to like parts in the various views.

THE DRAWING

DETAILED DESCRIPTION

Figure 1:
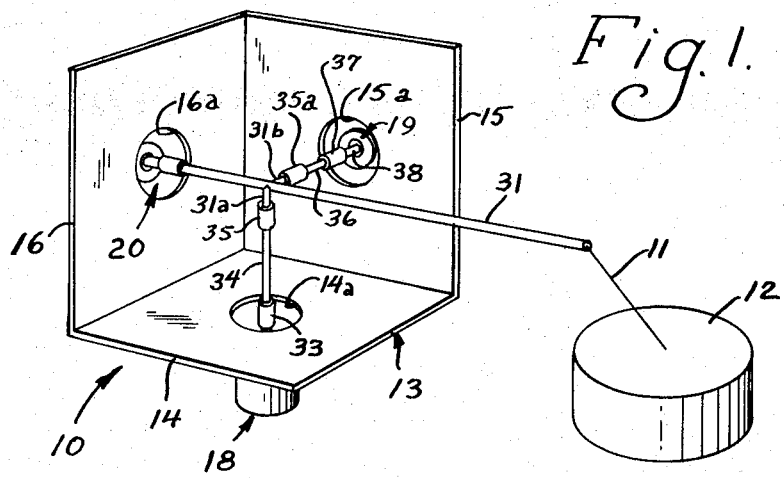
FIG. 1 is a perspective view of a probe positioner constructed according to the present invention.

Referring first to FIG. 1, a tool positioner station is generally designated by reference numeral 10, and a tool is designated 11. A block 12, which in this embodiment is stationary, is used as a work table and support for a specimen (not shown).

A support or frame generally designated by reference numeral 13 includes a horizontal plate 14 and orthogonally oriented vertical plates 15 and 16. Each of the plates 14–16 is provided with a central aperture, and these are designated respectively 14a–16a. To each of the plates 14–16 there is mounted an electromechanical transducer, such as a conventional speaker, with the axis of the transducer centered relative to its associated aperture. The linear electromechanical transducers are designated respectively by reference numerals 18, 19, and 20.

Figure 2:
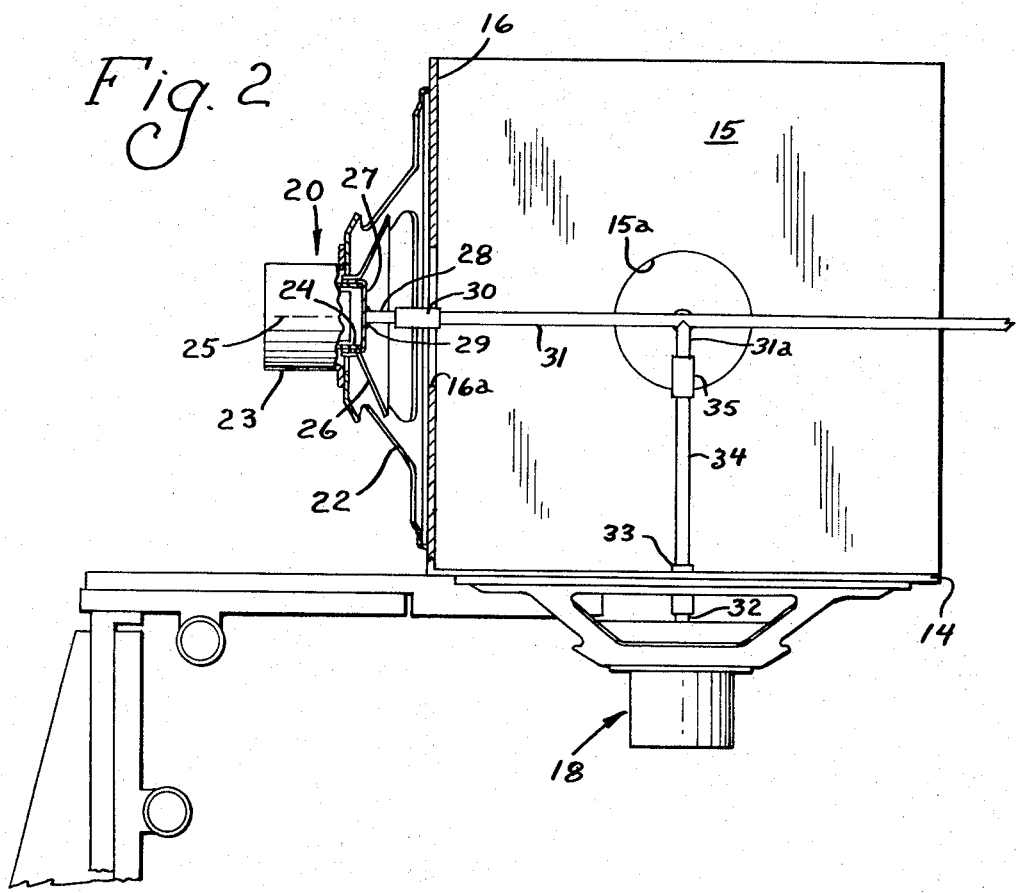
FIG. 2 is an enlarged vertical cross section of the positioner of FIG. 1 with the tool-supporting rod shown in fragmentary form.

Referring now to FIG. 2, the linear electromechanical transducers 18 and 20 may be seen in greater detail, a portion of the transducer 20 being shown in vertical section. Each of the transducers 18–20 may be similar, so that only one transducer need be described in greater detail in order to fully understand the present invention.

A generally conical protector member 22 is attached at its periphery to the wall 16. A coil case 23 houses a magnet (not seen) to exert a magnetic force on a conducting coil (also not shown) secured to a form 24. When at rest, the coil may be attracted to the rear wall of the housing 23 so as to bias the form 24 leftward, so that when current is supplied to the coil, it will be urged in a rightward direction as seen in FIG. 2. The axis of movement is indicated by the dashed line 25, and it will be seen that this axis of movement is aligned with the center of the aperture 16a. Thus, each transducer has a fixed portion and a movable portion. Because the electromechanical transducer selected was a conventional radio speaker, it included a diaphragm partially shown at 26. The outer periphery of the diaphragm 26 was originally connected to the periphery of the shield 22, but since it was not desired to convert the electrical energy to sound, the periphery of the diaphragm was cut away in order to reduce resistance to the movement of the center.

The form 24 has its right end covered with a piece of sheet material designated by reference numeral 27 to the center of which a dowel pin 28 is glued, for example, with epoxy glue as indicated at 29. The distal end of the pin 28 is fitted with a piece of plastic tube 30, the internal diameter of which is such as to snugly fit over the pin 28. An elongated rod 31 is pressed into the open end of the tube 30. The pin 28 and rod 31 may be formed from a common wooden rod, merely by severing it. The flexible coupling tube 30 takes the place of a universal or ball joint connection, and it is much less costly while completely reliable for all practical purposes. This type of coupling permits bending the rod 31 in either direction transverse of the movement of the pin 28 while, at the same time, translating the rod 31 as desired with movement of the form 24 and pin 28. Thus, the electromechanical transducer 20 produces a linear motion of a rod 31 while permitting it to be independently moved in a transverse direction. Other types of coupling may be used with like results, but the one described has been found to be inexpensive with no loss of accuracy for the small forces involved.

The transducer 18 is similarly provided with a central pin 32, to the distal end of which there is fitted a coupling tube 33 which also receives a rod 34. To the distal end of the rod 34 there is fitted a second coupling tube 35, and the coupling tube 35 is connected to an extension 31a extending outwardly of the rod 31.

As best seen in FIG. 1, a second extension 31b of rod 31 is connected to a coupling tube 35a. The tube 35a receives a second pin 36 which is connected to the transducer 19 by means of a coupling tube 37 and a central pin 38. The pin 38 is, of course, moved by action of the electromechanical transducer 19.

It will be observed from FIG. 1 that the rod 31 extends considerably beyond the connection to the transducers 18, 19; although this may be changed to effect any desired mechanical advantage (and thus, provide a means for adjusting the movement ratio between the hand lever and the tool 11).

Figure 3:
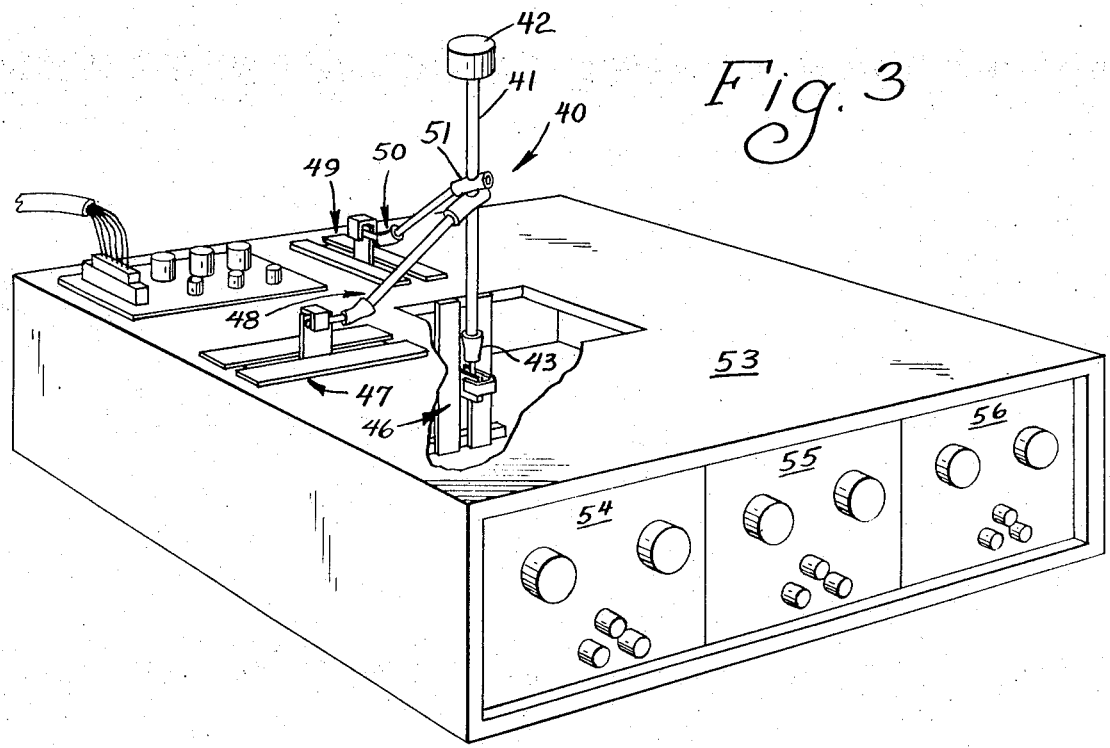
FIG. 3 is a perspective view of the hand lever and control module.

Turning now to FIG. 3, the hand lever control mechanism is generally designated by reference numeral 40, and it includes a vertical elongated rod 41 at the top of which is mounted a knob or handle 42. The bottom of the rod 41 is fitted with a flexible tube coupler 43 similar to those which have already been described, and the bottom of the tube coupler 43 is attached to the movable arm of a linear potentiometer generally designated by reference numeral 46. A second linear potentiometer generally designated 47 is similarly connected by means of a bendable link 48 to an intermediate position on the rod 41. Finally, a third linear potentiometer 49 is connected by means of a similar bendable link 50 to an intermediate position on the rod 41 as at 51. As an operator controls the position of the rod 41, he simultaneously controls the relative positioning of the movable arms on the potentiometers 46, 47 and 49 to generate a signal representative of a desired position on the three electromechanical transducers which, correspondingly are the transducers 18, 20 and 19. Thus, the horizontal motion of the tool is controlled by moving the movable arm of the two horizontal potentiometers 47, 49 to control the extension of the movable portions of the electromechanical transducers 20, 19. The vertical positioning of the tool is accomplished by moving the arm of the potentiometer 46 to control the positioning of the movable part of the linear electromechanical transducer 18. It will be appreciated that in order to move the tool vertically, then, the rod 41 is translated vertically, as distinguished from the prior pneumatic control wherein a knob was twisted inwardly or outwardly to change the pressure exerted by a pneumatic pump, the cylinder of which formed the vertical control lever.

The potentiometers 46, 47 and 49 are housed in a cabinet 53 at the front of which are mounted three indicator/control panels 54, 55 and 56 for controlling the voltage fed to the three potentiometers 46, 47 and 49.

Figure 5:
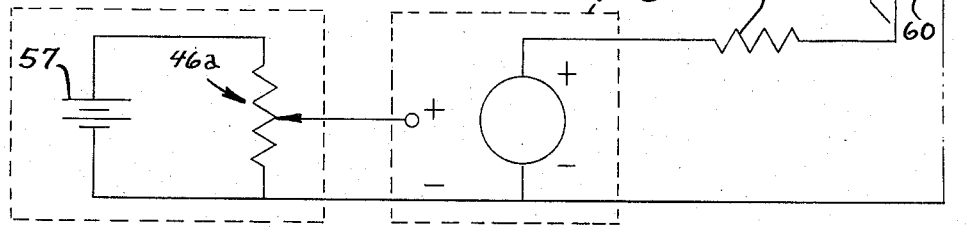
FIG. 5 is an electrical schematic diagram of one control channel.

A schematic diagram for one control channel for one of the three linear potentiometers (the potentiometer 46) is shown in FIG. 5. A power supply associated with the control panel 54 is designated 57 in FIG. 5, and it is connected to the fixed termals of a linear potentiometer, shown schematically and designated 46a, corresponding to the linear vertical potentiometer 46 of FIG. 3. The movable arm of the potentiometer is connected to the input of a voltage amplifier enclosed within the dashed line 58. The voltage amplifier 58 may be any one of the number of well-known voltage amplifiers, the primary characteristic being a low output impedance. For the illustrated embodiment there is no polarity inversion. The output terminals of the voltage amplifier 58 are connected to a series circuit including a resistor 59 and a coil 60 associated with the vertical electromechanical transducer 18. The resistor 59 is used to linearize and limit the current through the coil 60. That is, resistor 59 in series with the voltage source 58 becomes a source of controlled current. As has already been mentioned, controlling the input voltage to the amplifier 58 may be from the linear potentiometer 46a or it may be from another voltage source, such as analog output voltages from a programmed device, for example, a digital computer with digital-to-analog conversion equipment.

It will also be observed that the movement ratio between the control lever 40 and the tool positioner 10 may be affected either by changing the gain of the voltage amplifier 58 or by changing the value of the resistor 59. Voltage amplifiers with variable gain are also well-known in the art. The voltage amplifiers for all three channels or correspondingly, the current limiting resistors for all three channels may be ganged mechanically so as to move in unison to thereby preserve the same movement ratio for all three channels. That is, for most uses it would be undesirable to vary the movement ratio for each channel independently of the others.

Figure 4:
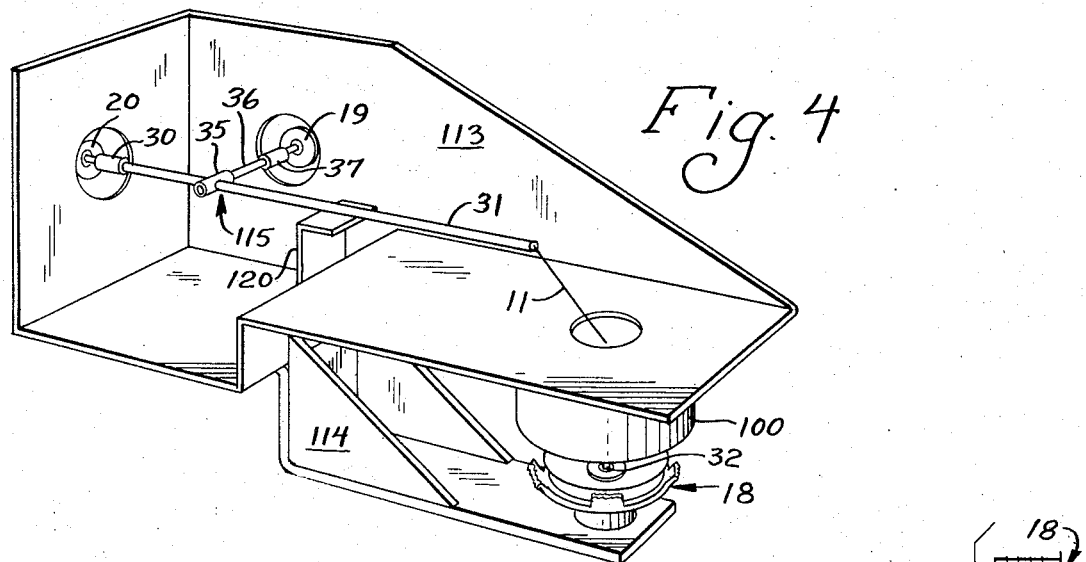
FIG. 4 is a perspective view of an alternative embodiment of the probe positioner wherein the sample is moved relative to the probe in a vertical direction.

Turning now to FIG. 4, there is shown an embodiment wherein the sample or specimen being investigated or treated is mounted on a movable platform or support, the support being designated by reference numeral 100. Elements found in FIG. 3 which correspond to those of the embodiment of FIG. 1 are similarly designated. Thus, electromechanical transducers 19 and 20 are secured in orthogonally oriented relation to a frame, designated 113. The frame 113 includes a lower extension or platform 114 on which an electromechanical transducer generally designated 18 is mounted. The transducer 18 includes a central pin 32 on which the support or platform 100 is secured. A flexible linkage generally designated by reference numeral 115 including a rod 31 and flexible couplings 30, 35 and 37 as well as a rod 36, all of which have counterparts in the embodiment of FIG. 1, control the position of the tool 11 in a horizontal plane, and the electromechanical transducer 18 controls the positioning of the specimen relative to the tool 11 in a vertical position. This enables a technician or operator to focus a microscope in a fixed horizontal plane which contains the distal end of a tool or instrument 11, and the specimen is then moved vertically relative to the tool or instrument to maintain focus. A pedestal 120 may be included with the frame 113 to maintain the rod 31 in its horizontal plane.

It will be observed that for the embodiment of FIG. 4, the electronic controls may be exactly the same as those which have already been described except that one channel now controls the positioning of the specimen (via electromechanical transducer 18) rather than the vertical positioning of the tool itself. The control circuitry, however, does not see this difference and may be the same as has already been described.

Having thus described in detail alternative embodiments of the invention, persons skilled in the art will be able to modify certain of the structure which has been illustrated and to substitute equivalent elements for those which have been disclosed while continuing to practice the principle of the invention; and it is, therefore, intended that all such modifications and substitutions be covered as they are embraced within the spirit and scope of the appended claims.

We claim:

1. A micromanipulator system for controlling the motion of a tool comprising: first, second and third electromechanical transducers mounted for independent motion along three orthogonal axes; each transducer including a movable portion, a fixed portion, a permanent magnet on one portion, and a conductive coil on the other portion; means for mounting the movable portion of said transducer for movement along a straight line; a rigid tool support holding said tool; laterally bendable coupling means connecting the movable portion of each transducer means with said tool support, whereby said tool support may be moved along any orthogonal axis independently of the others; hand-operated lever means remote from said tool and adapted to be moved by an operator; means for mounting said lever means while permitting independent three-axis motion thereof; first, second and third electrical control channels associated respectively with said first, second and third transducers for generating electrical control signals representative of a desired position for said tool and for coupling said control signals to said respective transducers to control the motion of said tool; first, second and third variable impedance means associated respectively with said first, second and third channels and positioned in orthogonally-oriented directions corresponding to the desired direction of motion of said transducers, said first, second and third channels including said impedance means respectively for generating said control signals; and linkage mechanism interconnecting said lever with said first, second and third impedance means for adjusting said electrical signals fed to said transducers in response to the movement of said lever.

2. A micromanipulator system for controlling the motion of a tool relative to a specimen comprising: first, second and third electromechanical transducers mounted for independent motion along three orthogonal axes; each transducer including a movable portion, a fixed portion, a permanent magnet on one portion, and a conductive coil on the other portion; means for mounting the movable portion of said transducer for movement along a straight line; a rigid tool support holding said tool; a support for said specimen; laterally bendable coupling means connected to the movable portion of said first and second transducer means with said tool support, whereby said tool support may be movable along either of said first and second orthogonal axes independently of the other; means connecting the movable portion of said third transducer means to said support for said specimen; hand-operated lever means remote from said tool and adapted to be moved by an operator; means for mounting said lever means while permitting independent three-axis motion thereof; first, second and third electrical control channels associated respectively with said first, second and third transducers for generating electrical control signals representative of a desired position for said tool and for coupling said control signals to said respective transducers to control the motion of said tool; first, second and third variable impedance means associated respectively with said first, second and third channels and positioned in orthogonally-oriented directions corresponding to the desired direction of motion of said transducers, said first, second and third channels including said impedance means respectively for generating said control signals; and linkage mechanism interconnecting said lever with said first, second and third impedance means for adjusting said electrical signals fed to said transducers in response to the movement of said lever.

* * * * *